(12) United States Patent
Goto et al.

(10) Patent No.: US 10,525,777 B2
(45) Date of Patent: Jan. 7, 2020

(54) METHOD FOR DETERMINING ROAD SURFACE CONDITION

(71) Applicant: BRIDGESTONE CORPORATION, Tokyo (JP)

(72) Inventors: Takato Goto, Tokyo (JP); Yasushi Hanatsuka, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 84 days.

(21) Appl. No.: 15/532,572

(22) PCT Filed: Nov. 17, 2015

(86) PCT No.: PCT/JP2015/082236
§ 371 (c)(1),
(2) Date: Jun. 2, 2017

(87) PCT Pub. No.: WO2016/088548
PCT Pub. Date: Jun. 9, 2016

(65) Prior Publication Data
US 2018/0264894 A1 Sep. 20, 2018

(30) Foreign Application Priority Data

Dec. 5, 2014 (JP) ................. 2014-247254

(51) Int. Cl.
*B60C 11/24* (2006.01)
*B60C 19/00* (2006.01)
(Continued)

(52) U.S. Cl.
CPC ............ *B60C 11/246* (2013.01); *B60C 19/00* (2013.01); *B60C 23/064* (2013.01); *B60T 8/172* (2013.01);
(Continued)

(58) Field of Classification Search
CPC ...................................................... B60C 11/246
(Continued)

(56) References Cited

U.S. PATENT DOCUMENTS

2004/0117100 A1 6/2004 Kin
2006/0243043 A1* 11/2006 Breed ................... B60C 23/041
73/146

(Continued)

FOREIGN PATENT DOCUMENTS

JP 2004-198203 A 7/2004
JP 2007-055284 A 3/2007
(Continued)

OTHER PUBLICATIONS

Communication dated Oct. 18, 2017 from the European Patent Office in counterpart Application No. 15864328.8.
(Continued)

*Primary Examiner* — Tarun Sinha
(74) *Attorney, Agent, or Firm* — Sughrue Mion, PLLC

(57) ABSTRACT

In a method for determining a road surface condition, the speed of calculation is improved by applying an appropriate path limitation. To further improve the accuracy of determination, a time-series waveform of tire vibration detected by an acceleration sensor is windowed at time width T by a windowing means, and time-series waveforms of tire vibration in the respective time windows are extracted before feature vectors $X_i$ of the respective time windows are calculated. Then kernel functions $K_A(X, Y)$ are calculated from the feature vectors $X_i$ for the respective time windows and road surface feature vectors $Y_i$, which are feature vectors for the respective time windows calculated from time-series waveforms of tire vibration having been determined in advance for distinctive road surface conditions. In doing so, the kernel functions are calculated after weighting respective (Continued)

paths by weighting parameters ω (i, j) using a time-series waveform length corresponding value in the time-series waveform of tire vibration as measured and a previously determined time-series waveform length corresponding value in the time-series waveform of tire vibration.

6 Claims, 10 Drawing Sheets

(51) Int. Cl.
*B60T 8/172* (2006.01)
*B60W 40/06* (2012.01)
*B60W 40/068* (2012.01)
*B60C 23/06* (2006.01)

(52) U.S. Cl.
CPC .......... *B60W 40/06* (2013.01); *B60W 40/068* (2013.01); *B60C 2019/004* (2013.01); *B60T 2210/12* (2013.01); *B60W 2550/14* (2013.01)

(58) Field of Classification Search
USPC .......................................................... 73/584
See application file for complete search history.

(56) References Cited

U.S. PATENT DOCUMENTS

| | | | |
|---|---|---|---|
| 2010/0199756 A1* | 8/2010 | Hanatsuka | B60C 11/24 73/146 |
| 2010/0294032 A1* | 11/2010 | Pannek | B60T 8/1725 73/146 |
| 2012/0330493 A1 | 12/2012 | Hanatsuka et al. | |
| 2013/0030256 A1* | 1/2013 | Fujita | A61B 5/18 600/300 |
| 2013/0116972 A1* | 5/2013 | Hanatsuka | B60T 8/172 702/167 |
| 2013/0225940 A1* | 8/2013 | Fujita | A61B 5/0245 600/300 |
| 2015/0210286 A1* | 7/2015 | Hanatsuka | B60C 99/00 701/34.4 |

FOREIGN PATENT DOCUMENTS

| | | |
|---|---|---|
| JP | 2007-99245 A | 4/2007 |
| JP | 2013-006533 A | 1/2013 |
| JP | 2014-035279 A | 2/2014 |
| WO | 2014/025018 A1 | 2/2014 |

OTHER PUBLICATIONS

International Preliminary Report on Patentability with translation of Written Opinion dated Jun. 15, 2017 issued in counterpart International Application No. PCT/JP2015/082236.

International Search Report of PCT/JP2015/082236 dated Feb. 16, 2016.

* cited by examiner

METHOD FOR DETERMINING ROAD SURFACE CONDITION

CROSS REFERENCE TO RELATED APPLICATIONS

This application is a National Stage of International Application No. PCT/JP2015/082236 filed Nov. 17, 2015, claiming priority based on Japanese Patent Application No. 2014-247254 filed Dec. 5, 2014, the contents of all of which are incorporated herein by reference in their entirety.

BACKGROUND OF THE INVENTION

1. Field of the Invention

The present invention relates to a method for determining a condition of a road surface on which a vehicle travels, and more particularly to a method for determining a road surface condition using data of a time-series waveform of tire vibration only.

2. Description of the Related Art

There have been conventional methods for determining a road surface condition using only the data of a time-series waveform of tire vibration during vehicular travel. Used in one of such methods for determining a road surface condition are kernel functions calculated from feature vectors for respective time windows calculated from the time-series waveform extracted by windowing the time-series waveform of tire vibration and road surface feature vectors, which are feature vectors for the respective time windows calculated from the time-series waveform of tire vibration having been determined in advance for distinctive road surface conditions (see Patent Document 1, for instance).

CONVENTIONAL ART DOCUMENT

Patent Document

Patent Document 1: Japanese Unexamined Patent Application Publication No. 2014-35279

SUMMARY OF THE INVENTION

Problem to be Solved by the Invention

However, the above-mentioned method has taken much time in performing calculation of kernel functions because all the paths involved are taken into consideration. Furthermore, the accuracy in determining a road surface condition has not been sufficient because the paths with low degrees of similarity are also calculated.

The present invention has been made in view of the foregoing problems, and an object of the invention is to improve the speed of calculation by applying an appropriate path limitation and further improve the accuracy in determining a road surface condition.

Means for Solving the Problem

In one aspect of the present invention, the method determines a condition of a road surface under a tire in motion by detecting tire vibration by a vibration detecting means disposed within the tire. The method includes the steps of (a) detecting the vibration of the tire in motion, (b) extracting a time-series waveform of the detected tire vibration, (c) extracting time-series waveforms in respective time windows of a predetermined time width by windowing the time-series waveform of tire vibration, (d) calculating the feature vectors from the time-series waveforms in the respective time windows, (e) calculating kernel functions from the feature vectors calculated in step (d) and road surface feature vectors, which are the feature vectors of the respective time windows calculated from the time-series waveforms of tire vibration having been determined in advance for distinctive road surface conditions, and (f) determining a road surface condition based on the values of discriminant functions using the kernel functions. In this method, the kernel functions are the global alignment kernel functions, the dynamic time warping kernel functions, or the computed values of the kernel functions. Also, in step (e), the kernel functions are calculated after each of path elements calculated from one of the calculated feature vectors for the respective time widths and one of the road surface feature vectors is weighted by weighting parameters ω using a time-series waveform length corresponding value N in the time-series waveform of tire vibration extracted in step (b) and a previously determined time-series waveform length corresponding value M of the time-series waveform of tire vibration. And in step (f), a road surface condition is determined by comparing the values of discriminant functions determined for the distinctive road surface conditions.

It is to be noted that the time-series waveform length corresponding value in the time-series waveform of tire vibration (hereinafter referred to as "time-series waveform length corresponding value" is a physical quantity corresponding to the time length of one revolution of a tire, such as the time length of the time-series waveform of tire vibration for one revolution of a tire or the time interval between the leading-end peak and the trailing-end peak in the time-series waveform of tire vibration.

BEST MODE FOR CARRYING OUT THE INVENTION

Hereinafter, the invention will be described based on preferred embodiments which do not intend to limit the scope of the claims of the present invention but exemplify the invention. Not all of the combinations of the features described in the embodiments are necessarily essential to the invention.

Figure 1:
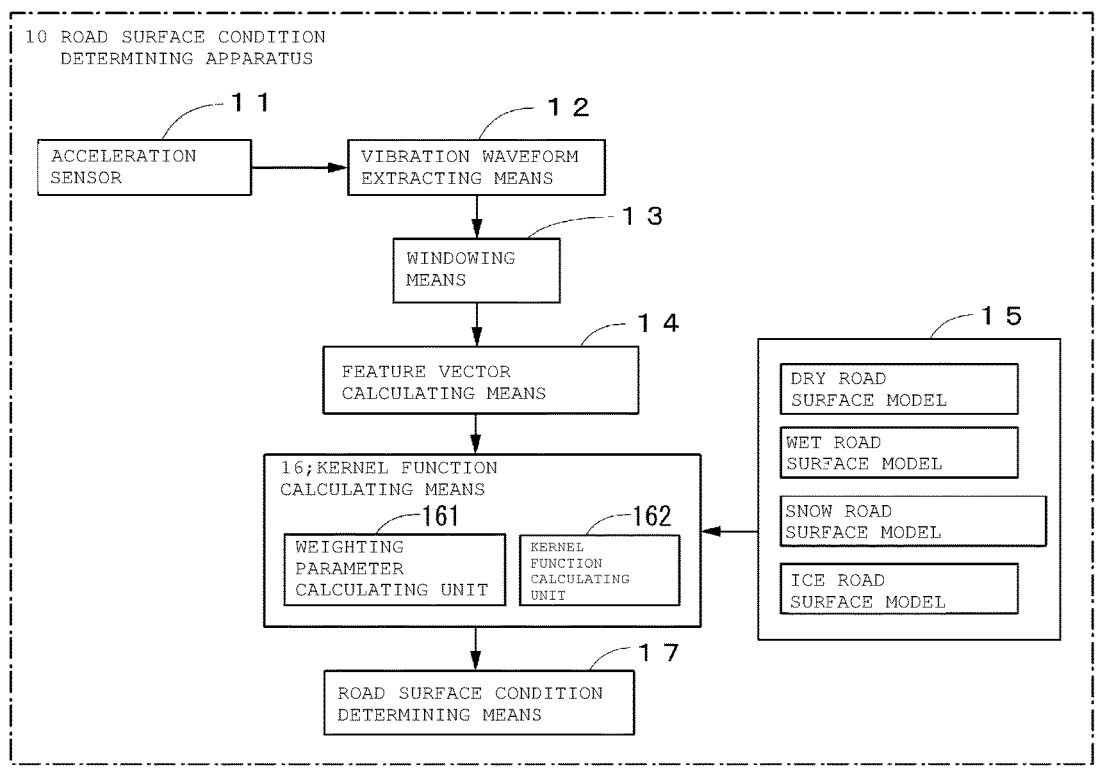
FIG. 1 is a functional block diagram showing a constitution of a road surface condition determining apparatus according to a preferred embodiment of the invention.

FIG. 1 is a functional block diagram showing a constitution of a road surface condition determining apparatus 10. The road surface condition determining apparatus 10 includes an acceleration sensor 11 as a tire vibration detecting means, a vibration waveform extracting means 12, a windowing means 13, a feature vector calculating means 14, a storage means 15, a kernel function calculating means 16, and a road surface condition determining means 17.

The series of means from the vibration waveform extracting means 12 to the road surface condition determining means 17 may be constituted by computer software and memory, such as RAM, for instance.

Figure 2:
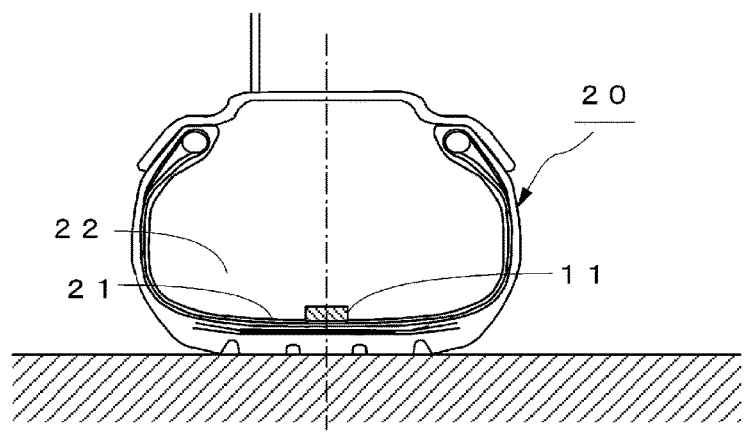
FIG. 2 is an illustration showing an example of location of an acceleration sensor.

The acceleration sensor 11 is located integrally at a substantially middle portion on the tire air chamber 22 side of the inner liner 21 of the tire 20 as shown in FIG. 2 and detects the vibration of the tire 20 inputted from a road surface. The signals of tire vibration, which are the outputs of the acceleration sensor 11, are converted into digital signals after being amplified by an amplifier, for instance, before they are sent to the vibration waveform extracting means 12.

The vibration waveform extracting means 12 extracts a time-series waveform of tire vibration from the signals of tire vibration detected by the acceleration sensor 11 for each revolution of the tire.

Figure 3:
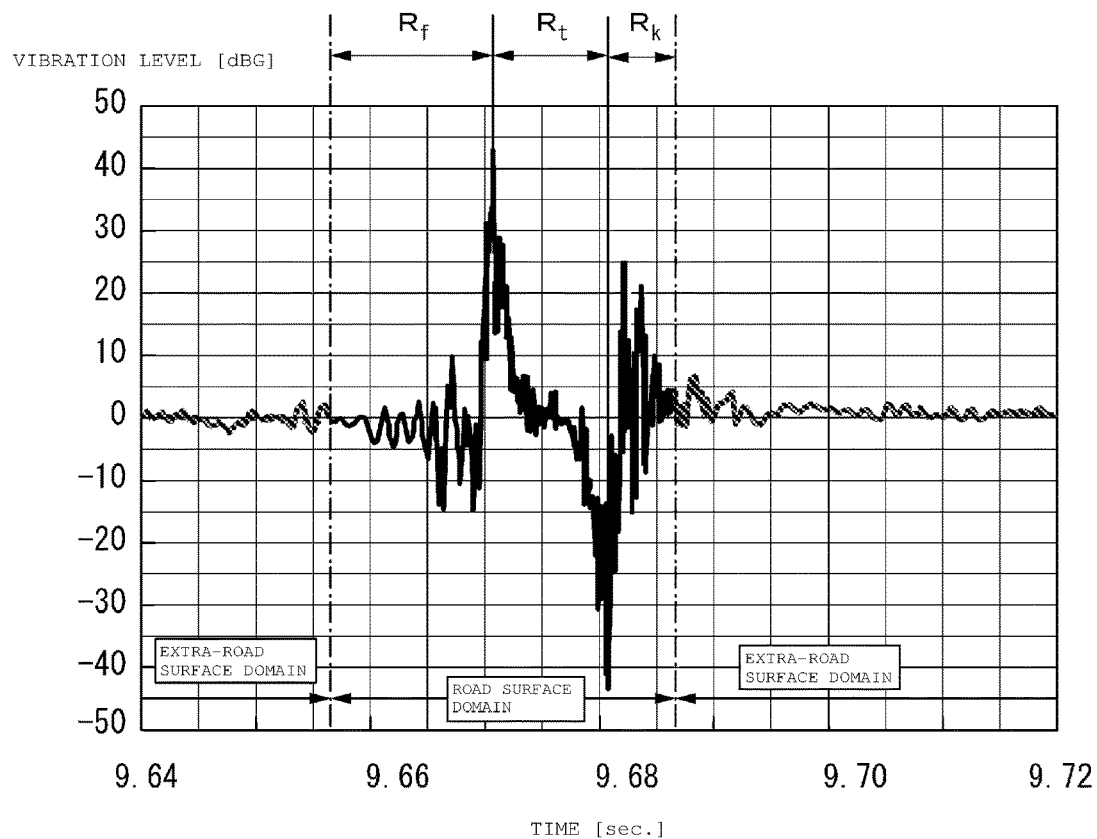
FIG. 3 is a diagram showing an example of a time-series waveform of tire vibration.

FIG. 3 is a diagram showing an example of a time-series waveform of tire vibration. The time-series waveform of tire vibration has large peaks near the leading end position and near the trailing end position. Also, different vibrations appear depending on road surface conditions in both the pre-leading-end domain $R_f$, which precedes the contact area domain $R_l$ where the land portions of the tire 20 are in contact with the ground, and the post-trailing-end domain $R_k$, which is the domain following the contact area domain $R_l$.

On the other hand, the vibrations in the domains before the pre-leading-end domain $R_f$ and after the post-trailing-end domain $R_k$ are little affected by the road surface, so that they show low vibration levels and contain no information on the road surface.

Hereinbelow, the pre-leading-end domain $R_f$, the contact area domain $R_l$, and the post-trailing-end domain $R_k$ will be referred to as the road surface domain, and the domains before the pre-leading-end domain $R_f$ and after the post-trailing-end domain $R_k$ as the extra-road surface domain.

The windowing means 13 windows the extracted time-series waveform at predetermined time width (called time window width also) T, extracts the time-series waveforms for the respective time windows, and sends them to the feature vector calculating means 14.

Of the time-series waveforms of tire vibration extracted for the respective time windows, the time-series waveforms in the extra-road surface domain contain little information on the road surface as mentioned above. In the present example, therefore, the extra-road surface time-series waveforms are not sent to the feature vector calculating means 14 so as to increase the speed of calculation of kernel functions.

It is to be noted that the extra-road surface domain may be defined as the domain having vibration levels lower than a background level, which is set for the time-series waveform of tire vibration, for instance.

Figure 4:
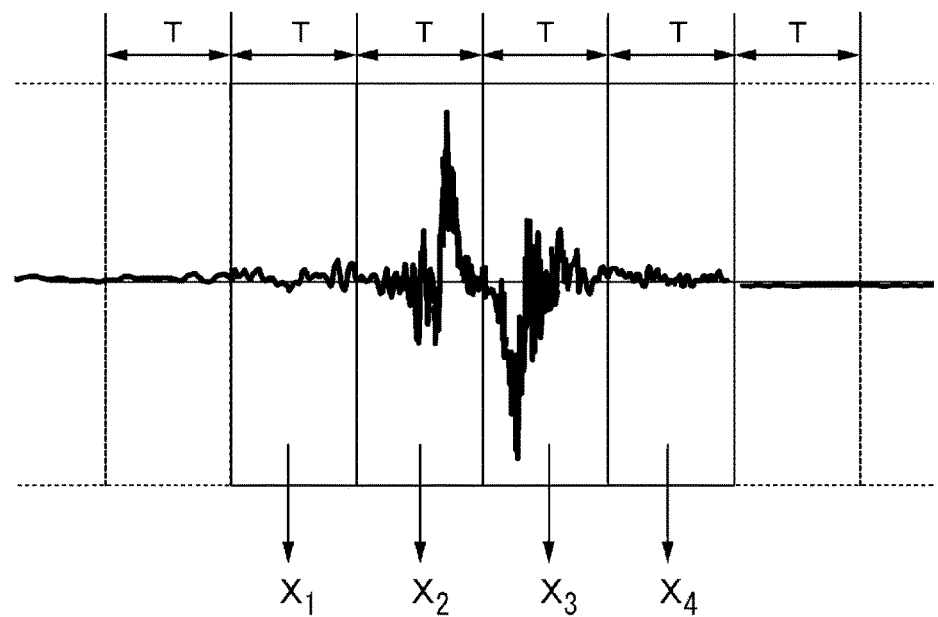
FIG. 4 is a diagram showing how to calculate feature vectors from a time-series waveform of tire vibration.

The feature vector calculating means 14 calculates the feature vectors $X_i$ (i=1 to N: N being the number of time-series waveforms extracted for the time windows) for the time-series waveforms extracted for the respective time windows as shown in FIG. 4.

In the present example, the vibration levels (power values of filtered waveforms) $a_{ik}$ (k=1 to 5) of specific frequency ranges, which are obtained by passing the time-series waveform of tire vibration through the bandpass filters of 0-1 kHz, 1-2 kHz, 2-3 kHz, 3-4 kHz, and 4-5 kHz, respectively, are used as the feature vectors $X_i$. The feature vectors $X_i$ are $(a_{i1}, a_{i2}, a_{i3}, a_{i4}, a_{i5})$, and the number of the feature vectors $X_i$ is n.

Figure 5:
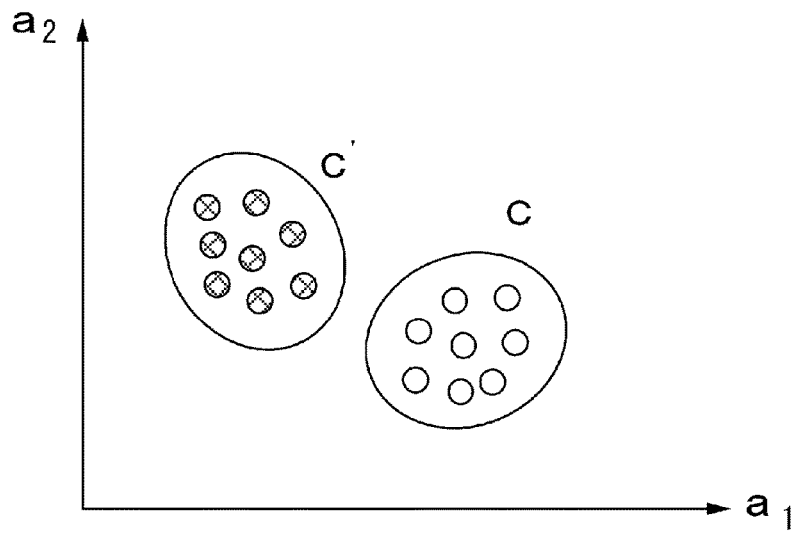
FIG. 5 is a schematic diagram showing input space for feature vectors.

FIG. 5 is a schematic diagram of input space for the feature vectors $X_i$. The axes of the diagram represent the vibration levels $a_{ik}$ of the specific frequency ranges, which are feature quantities, and the points represent the feature vectors $X_i$. Although the actual input space is a 6-dimensional space of five specific frequency ranges plus one time axis, the diagram is represented 2-dimensionally (horizontal axis for $a_1$ and vertical axis for $a_2$).

Therefore, let us assume, for instance, that in this input space, a group C consisting of the feature vectors $X_i$ calculated for a vehicle running on a DRY road surface can be distinguished from a group C' consisting of the feature vectors $X'_i$ calculated for a vehicle running on a SNOW road surface. Then it is possible to determine whether the vehicle is running on a DRY road surface or on a SNOW road surface.

The storage means 15 stores four predetermined roar surface models for separating the DRY road surface from the other road surfaces, the WET road surface from the other road surfaces, the SNOW road surface from the other road surfaces, and the ICE road surface from the other road surfaces, using the discriminant functions f (x) each representing a separating hyperplane.

The road surface models are derived by learning, using the input data of road surface feature vectors $Y_{ASV}$ $(y_{jk})$, which are the feature vectors for respective time windows calculated from the time-series waveforms of tire vibration determined by operating test vehicles having a tire fitted with the acceleration sensor at various speeds on the DRY, WET, SNOW and ICE roads.

Note that the tire size to be used in learning may be a single size or a plurality of sizes.

The index A of the road surface feature vectors $Y_{ASV}$ $(y_{jk})$ represents DRY, WET, SNOW, or ICE. The index j (j=1 to M) represents the number of time-series waveforms extracted for time windows (Nos. of windows), and the index k represents the components of the vector (k=1 to n). That is, $y_{jk}=(a_{j1}, a_{j2}, a_{j3}, a_{j4}, a_{j5})$. Also, the SV is the abbreviation of support vectors, which represent the data in the neighborhood of the discriminant boundary selected by learning.

It is to be noted that when the Global alignment kernel functions (GA kernels) or the dynamic time warping kernel functions (DTW kernels) are used as the kernel functions as in the present example, the road surface feature vectors $Y_{ASV}$ $(y_{jk})$ are each a matrix of "the number of dimensions of the vectors $y_i$ (5 here)×the number of windows M".

Hereinafter, the road surface feature vectors $Y_{ASV}(y_{jk})$ are simply referred to as $Y_{ASV}$.

The method for calculating each of the road surface feature vectors $Y_{ASV}$ is the same as one for calculating the above-described feature vectors $X_i$. For example, the DRY road surface feature vectors $Y_{DSV}$ are calculated as follows. The time-series waveform of tire vibration during vehicular travel on a DRY road surface is first windowed at time width T. Then the time-series waveforms of tire vibration of respective time windows are extracted. And the DRY road surface feature vectors $Y_D$ are calculated for the respective time-series waveforms extracted for the respective time windows. Note that the number of dimensions of vectors $y_j$ of the DRY road surface feature vectors $Y_D$ is 5, which is the same as that of the feature vectors $X_i$. After this, the support vectors $Y_{DSV}$ are selected by learning $Y_D$ as learning data by a support vector machine (SVM). It should be noted here that not all of $Y_D$ must be stored in the storage means 15, but the selected $Y_{DSV}$ only should be stored therein.

The WET road surface feature vectors $Y_{WSV}$, the SNOW road surface feature vectors $Y_{SSV}$, and the ICE road surface feature vectors $Y_{ISV}$ can be obtained in the same way as the DRY road surface feature vectors $Y_{DSV}$.

It is critically important here that the time width T is of the same value as the time width T used in deriving the feature vectors $X_j$. If the time width T is fixed, the number M of the time-series waveforms of the time windows varies with the tire type and the vehicle speed. That is, the number M of the time-series waveforms of the time windows of the road surface feature vectors $Y_{ASV}$ is not necessarily in agreement with the number N of the time-series waveforms of the time windows of the feature vectors $X_j$. For example, when the tire type is the same, M<N if the vehicle speed in deriving the feature vectors $X_j$ is slower than the vehicle speed in deriving the DRY road surface feature vectors $Y_{DSV}$ and M>N if it is faster.

The road surface models are structured by SVM using distinctive road surface feature vectors $Y_A$ as learning data.

Figure 6:
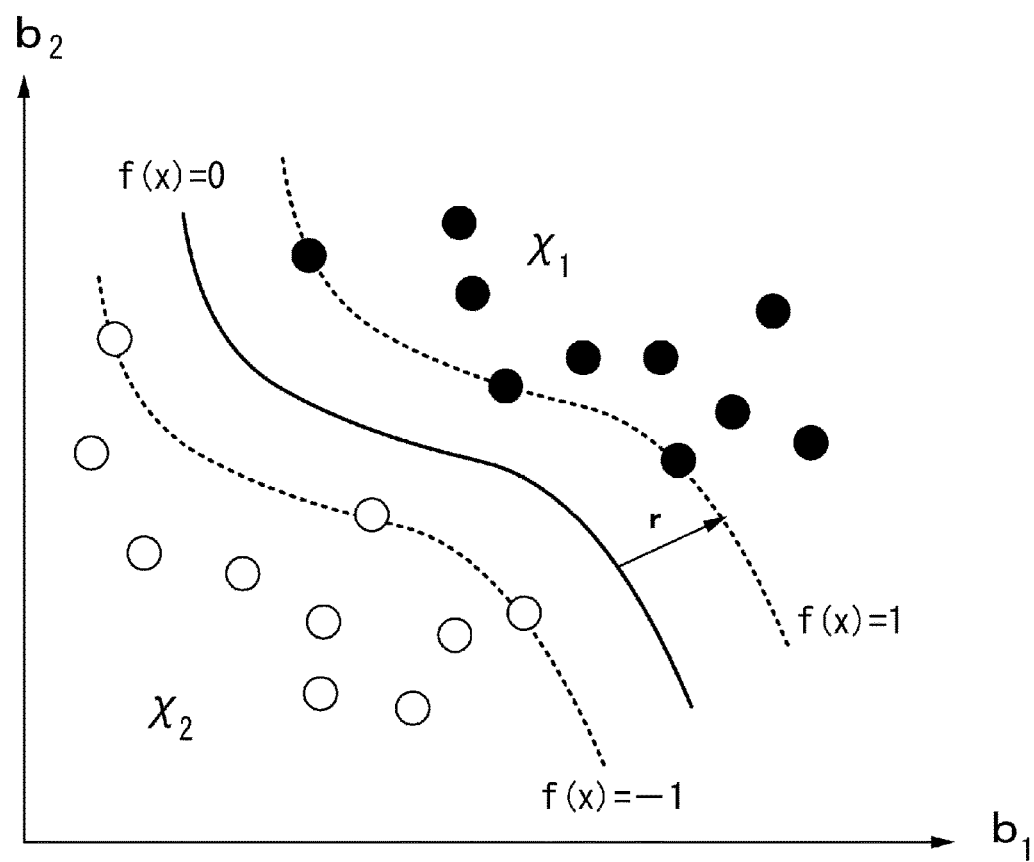
FIG. 6 is a diagram showing DRY road surface feature vectors and road surface feature vectors other than DRY road surface feature vectors on the input spaces for feature vectors.

FIG. 6 is a conceptual diagram showing the DRY road surface feature vectors $Y_{DSV}$ and the road surface feature vectors $Y_{nDSV}$ other than those of the DRY road surface on an input space, the black circles representing the DRY road surface feature vectors and the lighter-tinted circles the road surface feature vectors other than those of the DRY road surface.

It is to be noted that, as already mentioned, the DRY road surface feature vectors and the road surface feature vectors other than those of the DRY road surface are both matrixes. To explain how to derive the discriminant boundary between the groups, FIG. 6 represents the DRY road surface feature vectors and the road surface feature vectors other than those of the DRY road surface in 2-dimensional vectors, respectively.

The discriminant boundary between the groups cannot normally be obtained by linear separation. Therefore, using a kernel method, the road surface feature vectors $Y_{DSV}$ and $Y_{nDSV}$ are linearly separated by mapping them to a high-dimensional feature space by a nonlinear mapping $\phi$. Thus, the road surface feature vectors $Y_{DSV}$ and $Y_{nDSV}$ are nonlinearly classified in the original input space.

More specifically, an optimum discriminant function $f(x)=w^T\phi(x)-b$ to discriminate the data is obtained using the set of data $X=(x_1, x_2, \ldots x_n)$ and the affiliated class $z=\{1, -1\}$.

Here, the data are the road surface feature vectors $Y_{Dj}$, $Y_{nDj}$, the affiliated class $z=1$ is the DRY road surface data represented by $X_1$ in the diagram, and the affiliated class $z=-1$ is the road surface data other than that of the DRY road surface represented by $X_2$. Also, w is a weight coefficient, b is a constant, and $f(x)=0$ is the discriminant boundary.

The discriminant function $f(x)=w^T\phi(x)-b$ is optimized by use of Lagrange's method of undetermined multipliers, for instance. This optimization problem can be substituted with the following expressions (1) and (2).

[Formula 1]

$$\text{maximize} \sum_{\alpha} \lambda_\alpha - \frac{1}{2} \sum_{\alpha,\beta} \lambda_\alpha \lambda_\beta z_\alpha z_\beta \phi(x_\alpha)\phi(x_\beta) \quad (1)$$

$$\text{subject to} \sum_{\alpha} \lambda_\alpha z_\alpha = 0, \lambda_\alpha > 0 \quad (2)$$

Here $\alpha$ and $\beta$ are the indexes of a plurality of learning data. Also, $\lambda$ is Lagrange's multipliers, and $\lambda>0$.

At this time, by replacing the inner product $\phi(x_\alpha)\phi(x_\beta)$ by the kernel function $K(x_\alpha, x_\beta)$, the discriminant function $f(x)=w^T\phi(x)-b$ can be made nonlinear. It is to be noted that $\phi(x_\alpha)\phi(x_\beta)$ is the inner product after $x_\alpha$ and $x_\beta$ are mapped to a high-dimensional space by a mapping $\phi$.

The Lagrange multiplier $\lambda$ in the above equation (2) can be obtained using an optimization algorithm such as steepest decent method or SMO (sequential minimal optimization). In doing so, the use of the kernel function makes it unnecessary to obtain a high-dimensional inner product. Accordingly, the computational time can be shortened markedly.

In the present example, the global alignment kernel functions (GA kernels) are used as the kernel functions $K(x_\alpha, x_\beta)$.

Figure 7:
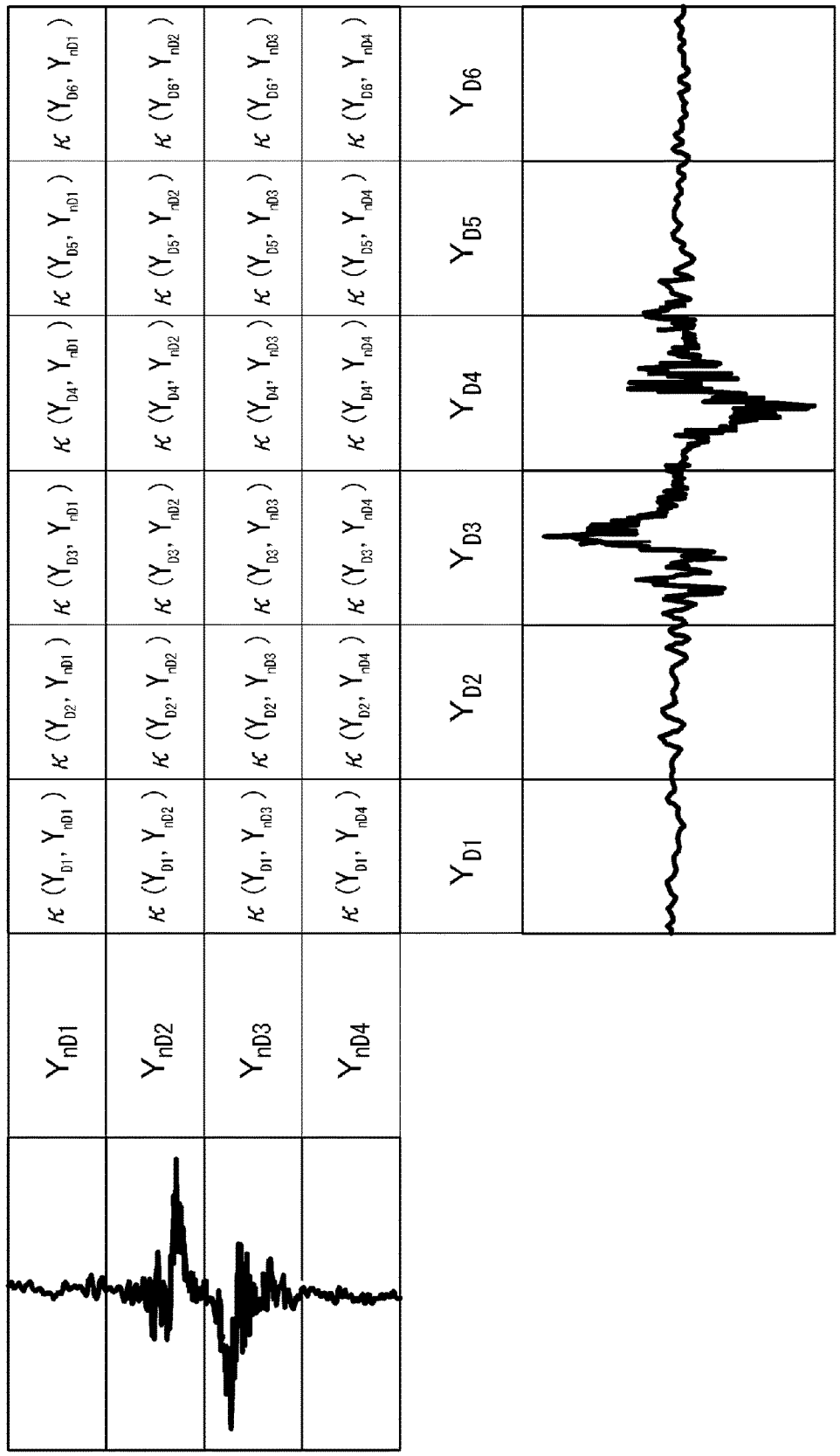
FIG. 7 is a diagram showing how to calculate conventional GA kernels.

As shown in FIG. 7, the GA kernel $K_{GA}(X, Y)$ is the function consisting of the total sum or total product of local kernels $\kappa(x_i, y_j)$, which represents the degree of similarity between the road surface feature vectors of R road surface $x$ ($x_i=Y_{Ri}$) and the road surface feature vectors of other than R road surface $y$ ($y_j=Y_{nRj}$). And this allows direct comparison between time-series waveforms of different time lengths. The local kernels $\kappa_{ij}(x_i, x_j)$ are derived for the respective windows at time width T.

With the conventional GA kernel $K_{GA}(X, Y)$, the total sum or total product of local kernels $\kappa(x_i, y_j)$ are obtained for all the possible alignments A (x, y). In other words, the GA kernel $K_{GA}(X, Y)$ is calculated for only the path element $\kappa(x_{\pi 1(s)}, y_{\pi 2(s)})$ for each path.

Hereinafter, the grid position $(\pi_1(s), \pi_2(s))$ of N×M, which consists of $(x_i, y_j)$, is referred to as "path (path element)".

In the present example, as shown in the following equations (3) to (6), the GA kernels $K_{GA}(X, Y)$ are calculated after the above-mentioned local kernels $\kappa(x_{\pi 1(s)}, y_{\pi 2(s)})$ are weighted by weighting parameters $\omega(i, j)$ using time-series waveform length corresponding values M and N in the time-series waveform of tire vibration, which are physical quantities corresponding to the time length of one tire revolution of the time-series waveform of tire vibration having been determined in advance.

[Formula 2]

$$K_{GA}(X, Y) = \sum_{\pi \in A(x,y)} \prod_{s=1}^{|\pi|} k'(X_{\pi 1(s)}, Y_{\pi 2(s)}) \quad (3)$$

-continued $$\omega(i, J) = \begin{cases} 1 - \dfrac{|M \cdot i - N \cdot j|}{T_p(N+M)} & \text{if } 1 - \dfrac{|M \cdot i - N \cdot j|}{T_p(N+M)} > S \\ 0 & \text{if } 1 - \dfrac{|M \cdot i - N \cdot j|}{T_p(N+M)} \le S \end{cases} \quad (4)$$

$$\kappa(x_{\pi 1(s)}, y_{\pi 2(s)}) = \exp\left(-\dfrac{\|x_{\pi 1(s)} - y_{\pi 2(s)}\|^2}{\sigma^2}\right) \quad (5)$$

$$\kappa'(x_{\pi 1(s)}, y_{\pi 2(s)}) = \dfrac{\omega(i, j) \cdot k(x_{\pi 1(s)}, y_{\pi 2(s)})}{2 - \omega(i, j) \cdot k(x_{\pi 1(s)}, y_{\pi 2(s)})} \quad (6)$$

The weighting parameters $\omega(i, j)$, as represented by equation (4), are parameters defined by the total number of time-series (number of windows) N of X (R road surface here), the total number of time-series (number of windows) M of Y (other than R road surface here), the time-series index (window number) i of X, the time-series index (window number) j of Y, and the calculation domain width $T_p$. The weighting parameters $\omega(i, j) = 1 - |M \cdot i - N \cdot j|/\{T_p(N+M)\}$ when $1 - |M \cdot i - N \cdot j|/\{T_p(N+M)\}$ is in excess of the predetermined threshold value S. And $\omega(i, j) = 0$ when $1 - |M \cdot i - N \cdot j|/\{T_p(N+M)\}$ is equal to or below the predetermined threshold value S.

As described above, since the calculation domain width $T_p$ is constant, the numbers of windows M and N are dependent on the wheel speed (wheel rotation speed to be exact). That is, the weighting parameters $\omega(i, j)$ are dependent on the time-series waveform length corresponding value, such as the tire rotation speed at the time of acquiring the time-series waveform of tire vibration, the length of the time-series waveform of tire vibration, or the inter-peak distance of the time-series waveform of tire vibration.

In this manner, the weighting parameters $\omega(i, j)$ are chosen to be the values corresponding to the length of time-series waveform. Thus it is possible to improve the accuracy of the degree of similarity (weighted local kernels $\kappa'(x_{\pi 1(s)}, y_{\pi 2(s)})$ to be discussed later) between the feature vectors $X_i$, $Y_{Aj}$ (or $X_i$, $Y_{nAj}$) when there is a difference between the number N of the time-series waveforms of time windows when the feature vectors $X_i$ are derived and the number M of the time-series waveforms of time windows when the road surface feature vectors $Y_{Aj}$ (or $Y_{nAj}$) are derived.

It is to be noted that the time-series waveform length corresponding value may be any one or a plurality of the tire rotation speed at the acquisition of the time-series waveform of tire vibration, the length of the time-series waveform of tire vibration, and the inter-peak distance of the time-series waveform of tire vibration.

Figure 8A:
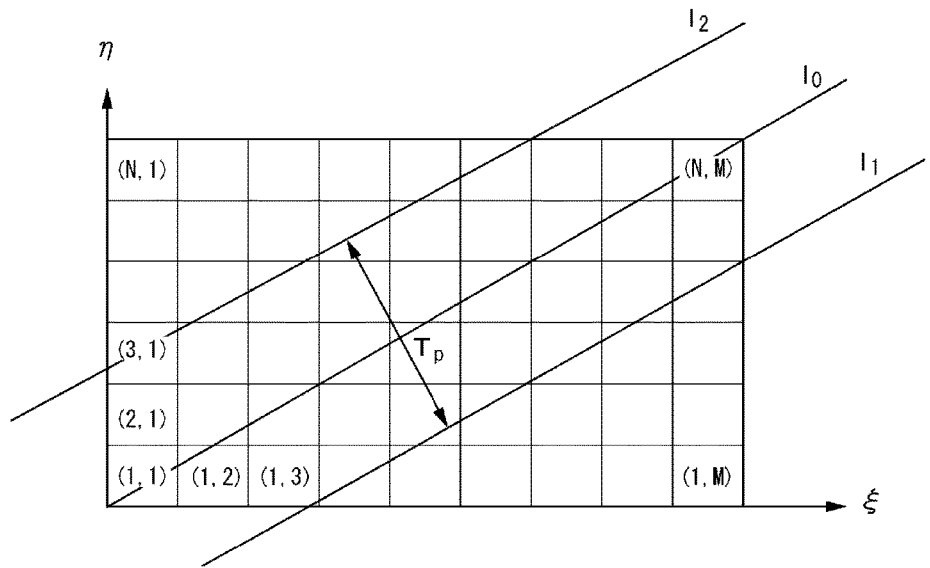
FIG. 8A and FIG. 8B are diagrams for explaining a calculation domain width and path limitation.

As shown in FIG. 8A, the calculation domain width $T_p$ is the width of the domain enclosed by two straight lines $l_1$ and $l_2$ in parallel with the straight line $l_0$ connecting paths (1, 1) and (M, N) and can be set optionally. The straight line $l_0$ can be expressed as $\eta = (M/N) \cdot \xi$ where the left below point of path (1, 1) is the origin, the direction in extension of $y_{\pi 2(s)}$ is the $\xi$ axis, and the direction in extension of $x_{\pi 1(s)}$ is the $\eta$ axis. Also, the straight line $l_1$ can be expressed as $\eta = (M/N) \cdot \xi - c$, and the straight line $l_2$ as $\eta = (M/N) \cdot \xi + c$.

The equation (6) is a formula for computation of the weighted local kernels $\kappa'(x_{\pi 1(s)}, y_{\pi 2(s)})$. Weighted like this, the weighting parameters $\omega(i, j)$ are 0 at the start end of one of two time-series waveforms and the end point of the other, or in the paths located near them. And the weighting parameters $\omega(i, j)$ are $1 - |M \cdot i - N \cdot j|/\{T_p(N+M)\}$ in the paths near the straight line $\eta = (M/N) \cdot \xi$ where the two time-series waveforms are located nearly in the same position.

Figure 8B:
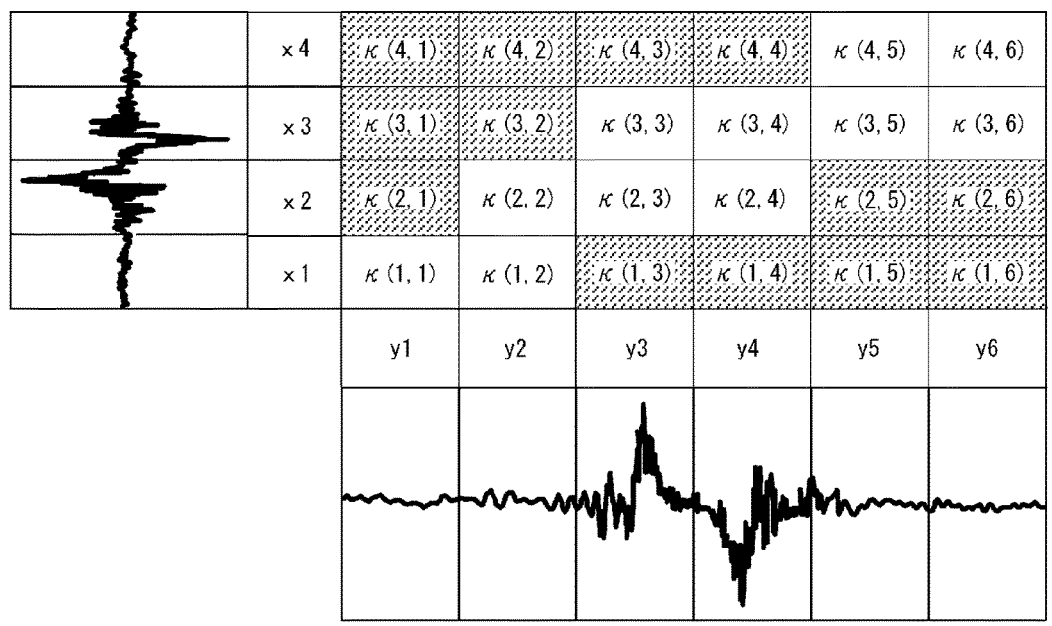

Accordingly, the GA kernels $K_{GA}(X, Y)$ are calculated only in the white paths, and not in the shaded paths, shown in FIG. 8B. As a result, the number of paths to be calculated can be effectively reduced. At the same time, the paths as noise which do not contribute to the determination of the degree of similarity are not used for calculation, which further improves the accuracy of determination.

It is to be noted that in the above equation (4) the calculation domain width $T_p$ may be omitted. Or, as will be described later, the weighting parameters $\omega(i, j)$ may be set using the calculation domain width $T_p$ only.

Or in the place of the above equation (4), $\kappa''(i,j) = \omega(i,j) \cdot \kappa(i,j)$ may be used as the weighted local camel.

The DRY road surface and the road surface other than the DRY road surface can be distinguished from each other with high accuracy by giving a margin to the discriminant function $f(x)$, which is the separating hyperplane between the DRY road surface feature vectors $Y_{Dj}$ and the road surface feature vectors $Y_{nDj}$ other than those of the DRY road surface.

The margin as used herein is the distance from the separating hyperplane to the closest sample (support vector). The separating hyperplane, which is the discriminant boundary, is $f(x) = 0$. And the DRY road surface feature vectors $Y_{Dj}$ are all in the domain of $f(x) \ge +1$, whereas the road surface feature vectors $Y_{nDj}$ other than those of the DRY road surface are in the domain of $f(x) \le -1$.

The DRY road surface model for distinguishing the DRY road surface from the other road surfaces is an input space having support vectors $Y_{DSV}$ at a distance of $f(x) = +1$ and support vectors $Y_{nDSV}$ at a distance of $f(x) = -1$. There are normally a plurality of $Y_{DSV}$ and $Y_{nDSV}$.

The same applies to the WET road surface model for distinguishing the WET road surface from the other road surfaces, the SNOW road surface model for distinguishing the SNOW road surface from the other road surfaces, and the ICE road surface model for distinguishing the ICE road surface from the other road surfaces.

The kernel function calculating means 16, which includes a weighting parameter calculating unit 161 and a kernel function calculating unit 162, calculates the respective GA kernels $K_D(X, Y)$, $K_W(X, Y)$, $K_S(X, Y)$, and $K_I(X, Y)$ from the feature vectors $X_i$ calculated by the feature vector calculating means 14 and the support vectors $Y_{ASV}$ and $Y_{nASV}$ (A=D, W, S, I) of the DRY model, WET model, SNOW model, and ICE model stored in the storage means 15.

The weighting parameter calculating unit 161 calculates a weighting parameters $\omega(i,j)$ in the paths (i, j) from the number N of time windows of feature vectors $X_i$, the number M of time windows of road surface feature vectors $Y_{Aj}$, and the predetermined calculation domain width $T_p$, using the above equation (4).

The kernel function calculating unit 162 calculates the weighted local kernels $\kappa'(x_{\pi 1(s)}, y_{\pi 2(s)})$ from the local kernels $\kappa(x_{\pi 1(s)}, y_{\pi 2(s)})$, where $x_{\pi 1(s)}$ are the feature vectors $X_i$ and $y_{\pi 2(s)}$ are the road surface feature vectors $Y_{Aj}$, $Y_{nAj}$, and the weighting parameters $\omega(i,j)$ calculated by the weighting parameter calculating unit 161. At the same time, the kernel function calculating unit 162 derives the total sum or total product of the local kernels $\kappa'(x_{\pi 1(s)}, y_{\pi 2(s)})$ for only the paths whose weighting parameters $\omega(i,j)$ are not 0 and determines them to be the GA kernel functions $K_R(X, Y)$ of R road surface.

Figure 9:
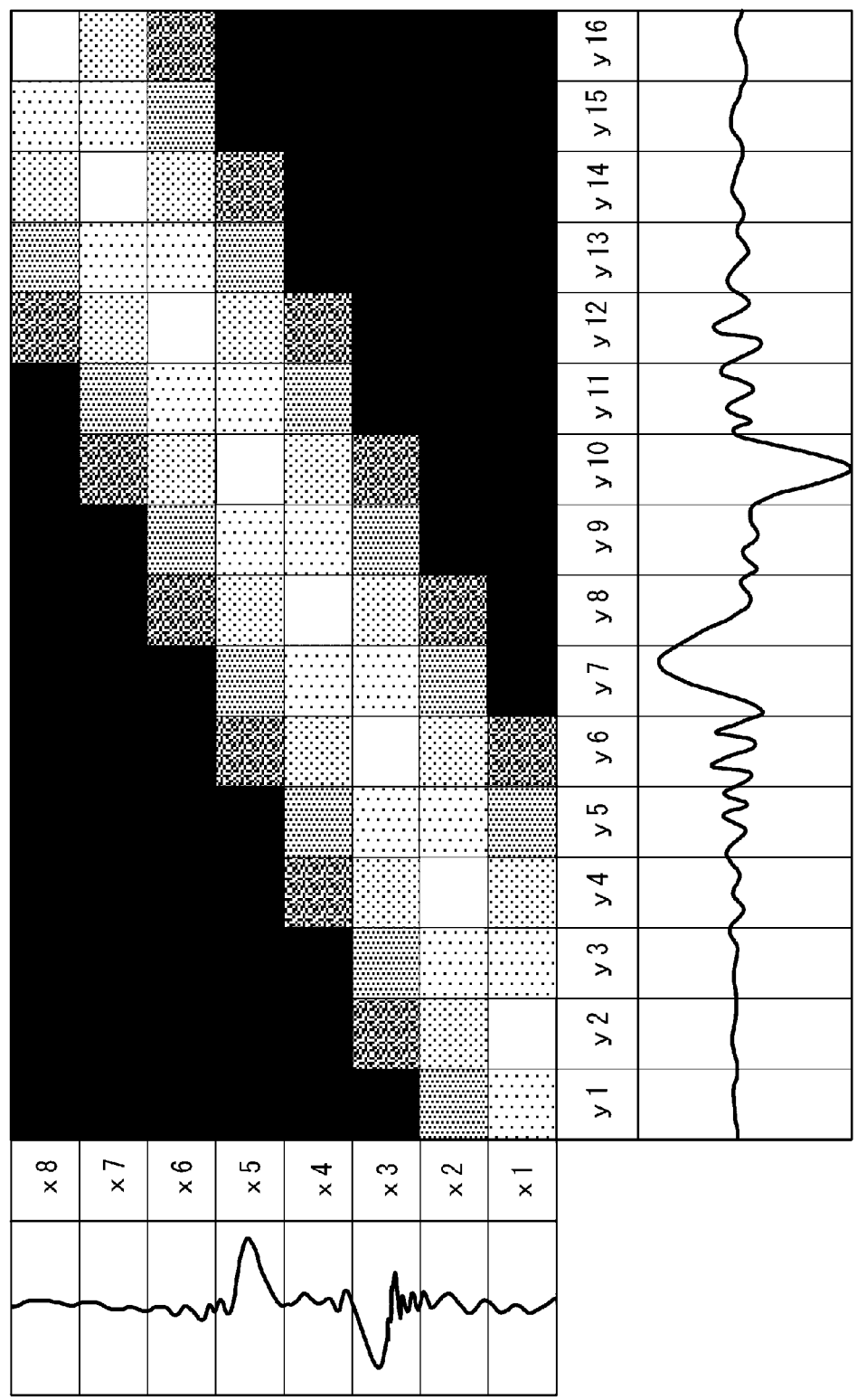
FIG. 9 is a diagram showing an example of path limitation by weighting.

FIG. 9 is a diagram showing an example of path limitation by the weighting parameters ω(i,j). The number of time windows of feature vectors $X_i$ is N=8, and the number of time windows of road surface feature vectors $Y_{Aj}$ is M=16. The blackened parts in the figure represent ω(i,j)=0, and the brighter the paths, the greater the ω(i,j) will be.

Path limitation in this manner based on the weighting parameters ω(i,j) will effectively reduce the number of paths to be calculated, thus greatly improving the speed of calculation.

Also, the blackened paths are not used in calculation as noise which does not contribute to the determination of the degree of similarity. And the kernel functions $K_R(X, Y)$ are obtained using only the paths showing high degrees of similarity where the two time-series waveforms are located nearly in the same position. This will improve the reliability of the kernel functions $K_R(X, Y)$.

Also, in the present example, the weighting parameters ω(i,j) are the values dependent on the numbers M and N of time windows. This kind of weighting is particularly effective when there is a difference between the number N of time-series waveforms of time windows in the acquisition of feature vectors $X_i$ and the number M of time-series waveforms of time windows in the acquisition of road surface feature vectors $Y_{Aj}$ (or $Y_{nAj}$).

The road surface condition determining means 17 determines the condition of a road surface based on the values of four discriminant functions $f_A(X)$ using kernel functions $K_A(X, Y)$, respectively, as shown in the following equations (7) to (10) (A=D, W, S, I).

[Formula 3]

$$f_D = \sum_{\alpha=1}^{N_{DSV}} \lambda_{D\alpha} z_D K_D(X, Y_\alpha) - b_D \quad (7)$$

$$f_W = \sum_{\alpha=1}^{N_{WSV}} \lambda_{W\alpha} z_{W\alpha} K_W(X, Y_\alpha) - b_W \quad (8)$$

$$f_S = \sum_{\alpha=1}^{N_{SSV}} \lambda_{S\alpha} z_{S\alpha} K_S(X, Y_\alpha) - b_S \quad (9)$$

$$f_I = \sum_{\alpha=1}^{N_{ISV}} \lambda_{I\alpha} z_{I\alpha} K_I(X, Y_\alpha) - b_I \quad (10)$$

where $f_D$ is the discriminant function for discriminating the DRY road surface from the other road surfaces, $f_W$ is the discriminant function for discriminating the WET road surface from the other road surfaces, $f_S$ is the discriminant function for discriminating the SNOW road surface from the other road surfaces, and $f_I$ is the discriminant function for discriminating the ICE road surface from the other road surfaces.

Also, $N_{DSV}$ is the number of support vectors of the DRY model, $N_{WSV}$ is the number of support vectors of the WET model, $N_{SSV}$ is the number of support vectors of the SNOW model, and $N_{ISV}$ is the number of support vectors of the ICE model.

The value of the Lagrange multiplier $\lambda_D$ of the discriminant function, for instance, is obtained by learning in deriving the discriminant function for discriminating the R road surface from the other road surfaces.

In the present example, the discriminant functions $f_D$, $f_W$, $f_S$, and $f_I$ are calculated, respectively, and a road surface condition is determined from the discriminant function that shows the largest value of the calculated discriminant functions $f_A$.

Figure 10:
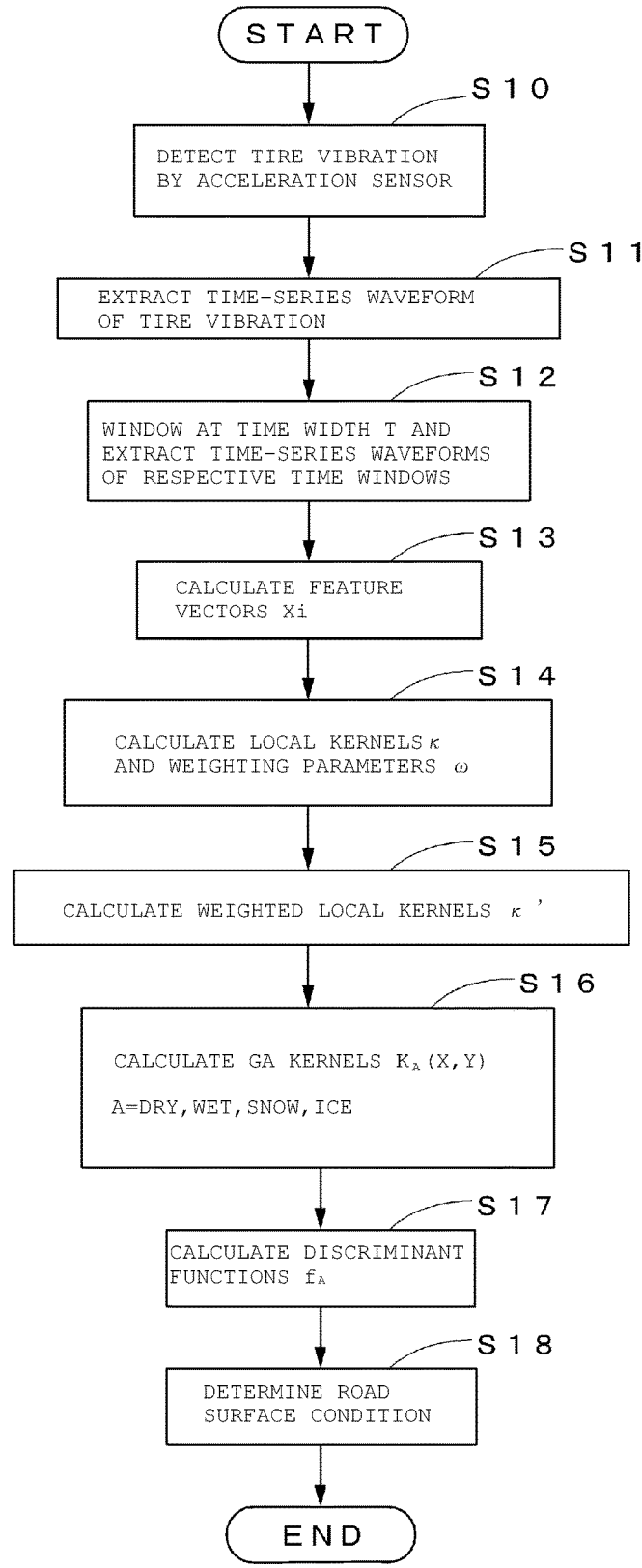
FIG. 10 is a flowchart showing a method for determining a road surface condition according to the present invention.

Next, a method for determining the condition of a road surface on which the tire 2 is running by the use of a road surface condition determining apparatus 10 is explained by referring to the flowchart of FIG. 10.

First, tire vibration caused by the input from a road surface on which the tire 20 is running is detected by an acceleration sensor 11 (step S10). And a time-series waveform of the tire vibration is extracted from the signals of the detected tire vibration (step S11).

Then the derived time-series waveform of tire vibration is windowed at predetermined time width T, and the time-series waveforms for the respective time windows are obtained. Here, the number of the time-series waveforms of tire vibration for the respective time windows is assumed to be M (step S12).

Next, feature vectors $X_i=(x_{i1}, x_{i2}, x_{i3}, x_{i4}, x_{i5})$ are calculated for the time-series waveforms extracted for the respective time windows (step S13).

The components $x_{i1}$ to $x_{ik}$ (k=1 to 5) of the feature vectors $X_i$ are the power values of filtered time-series waveforms of tire vibration as mentioned already.

Next, the local kernels $\kappa(x_{\pi^1(s)}, y_{\pi^2(s)})$ are calculated from the calculated feature vectors $X_i$ and the support vectors $Y_{Ak}$ of road surface models stored in the storage means 15, and at the same time the weighting parameters ω(i,j) are calculated (step S14).

And the weighted local kernels $\kappa'(x_{\pi^1(s)}, y_{\pi^2(s)})$ are calculated from the calculated local kernels $\kappa(x_{\pi^1(s)}, y_{\pi^2(s)})$ and the weighting parameters ω(i,j) (step S15). Then the total sum or total product of the weighted local kernels $\kappa'(x_{\pi^1(s)}, y_{\pi^2(s)})$ is obtained, and it is determined to be the GA kernel functions $K_R(X, Y)$ of the R road surface (step S16).

Next, four discriminant functions $f_D(x)$, $f_W(x)$, $f_S(x)$, and $f_I(x)$ using kernel functions $K_A(X, Y)$ are calculated, respectively (step S17). Then the values of the calculated discriminant functions $f_A(x)$ are compared with each other, and the road surface condition of the discriminant function that shows the largest value is determined to be the condition of the road surface on which the tire 20 is running (step S18).

In the present embodiment, as thus far described, in calculating the kernel function kernels $K_R(X, Y)$, weighting parameters ω(i,j) in the paths (i, j) are calculated from the number N of time windows of feature vectors $X_i$, the number M of time windows of road surface feature vectors $Y_{Aj}$, and the predetermined calculation domain width $T_p$. And the weighted local kernels $\kappa'(x_{\pi^1(s)}, y_{\pi^2(s)})$ are calculated from the weighting parameters ω(i,j) and the local kernels $\kappa(x_{\pi^1(s)}, y_{\pi^2(s)})$. At the same time, the total sum or total product of the local kernels $\kappa'(x_{\pi^1(s)}, y_{\pi^2(s)})$ is obtained for only the paths whose weighting parameters ω(i,j) are not 0 and it is determined to be the GA kernel functions $K_R(X, Y)$ of the R road surface. As a result, the speed of calculation can be greatly improved, and also the reliability of kernel functions $K_R(X, Y)$ can be improved.

Also, the weighting parameters ω(i,j) are the values dependent on the time-series waveform length corresponding value N for the time-series waveform of tire vibration at measurement and the predetermined time-series waveform length corresponding value M for the time-series waveform of tire vibration. Accordingly, the reliability of local kernels $\kappa'(x_{\pi^1(s)}, y_{\pi^2(s)})$ can be enhanced also.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

For example, in the foregoing embodiment, a weighting based on the time-series waveform length corresponding values M and N is done for each of the paths (i, j). However, a path limitation may be carried out using the calculation domain width $T_p$ only.

Figure 11:
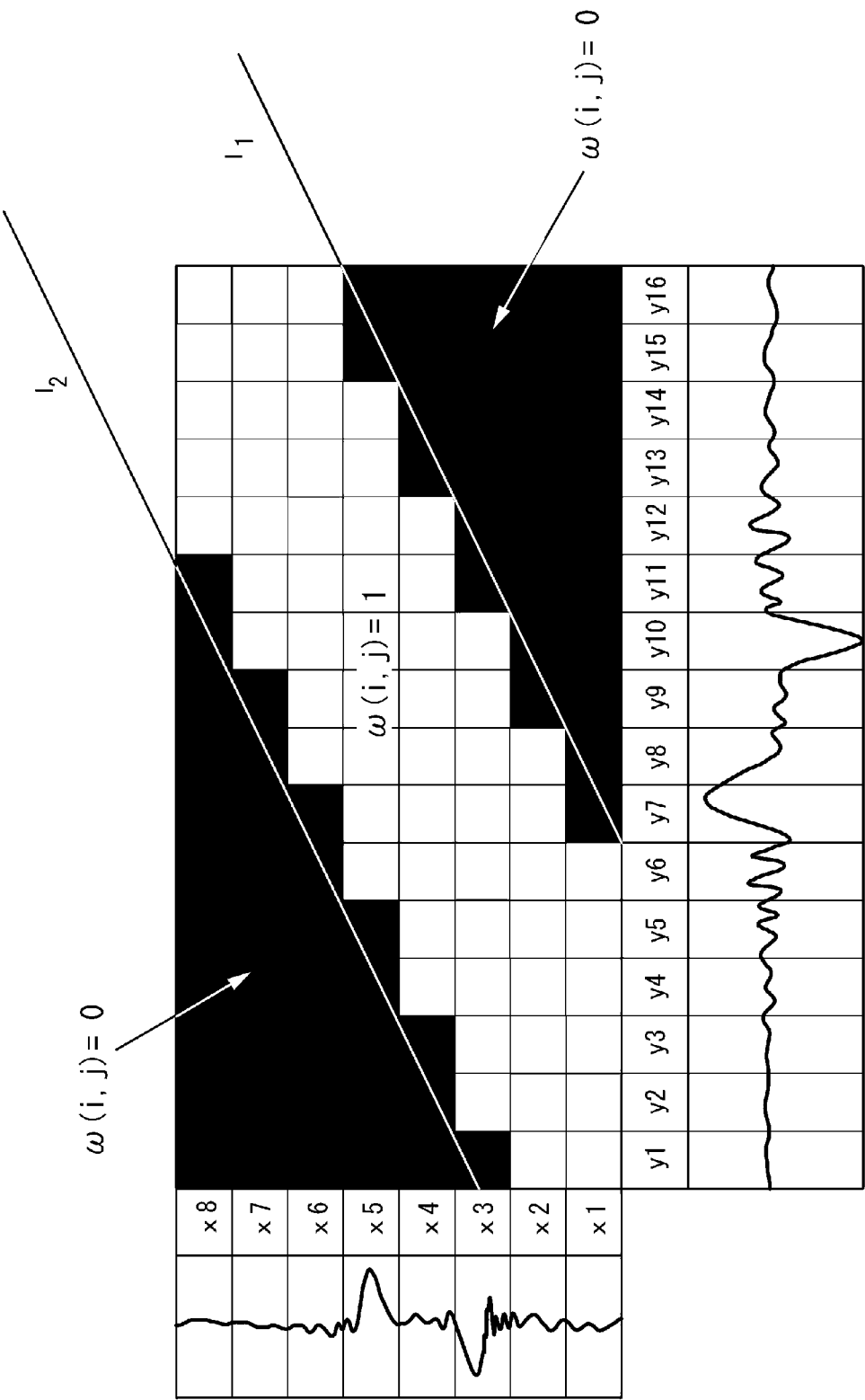
FIG. 11 is a diagram showing another example of path limitation by weighting according to the present invention.

More specifically, as shown in FIG. 11, the weighting parameters ω(p, q) in the paths (p, q) within the domain R enclosed by two straight lines (η=(M/N)·ξ±c) in parallel with the straight line j=(M/N)·i connecting paths (1, 1) and (M, N) may be set as "1", and the weighting parameters ω(p',q') in the paths (p', q) outside the domain R as "0".

Also, a path limitation may be done using the leading-end peak and the trailing-end peak in the tire vibration waveform instead of the time-series waveform length corresponding values M and N.

Figure 12:
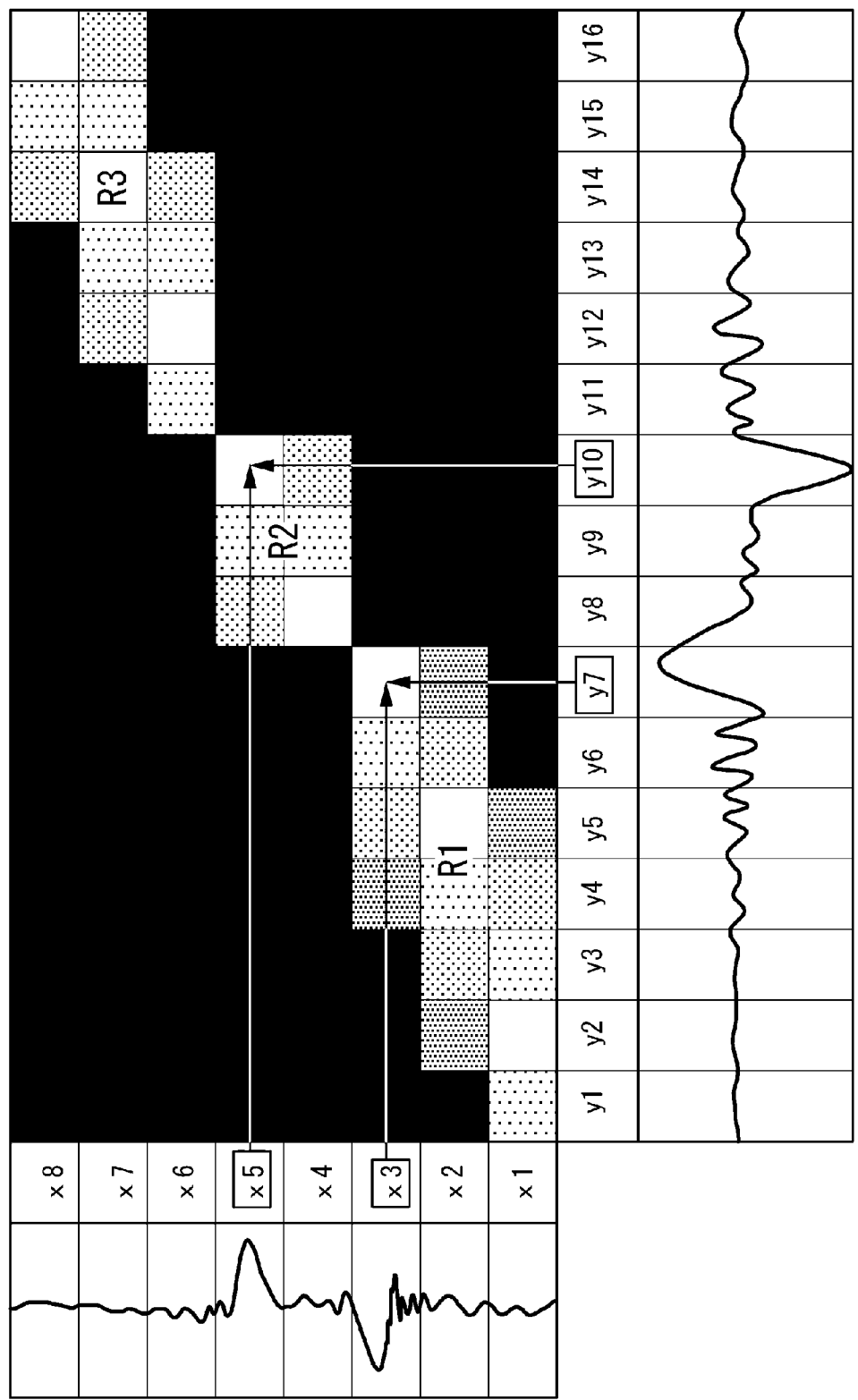
FIG. 12 is a diagram showing still another example of path limitation by weighting according to the present invention.

More specifically, as shown in FIG. 12, the path (3, 7) corresponding to the feature vector $x_3$ containing the leading-end peak and the road surface feature vector $y_7$ containing the leading-end peak and the path (5, 10) corresponding to the feature vector $x_5$ containing the trailing-end peak and the road surface feature vector $y_{10}$ containing the trailing-end peak may be determined to be the essential relay points of paths. And kernel functions may be calculated using only three domains of the 16×8 grids of ($x_i$, $y_j$), namely, the rectangular domain R1 having the diagonal connecting the starting point (1, 1) and the path (3, 7), the rectangular domain R2 having the diagonal connecting the path (3, 7) and the path (5, 10), and the rectangular domain R3 having the diagonal connecting the path (5, 10) and the ending point (8, 16).

Also, as shown in the figure, within each of the domains R1 to R3, a path limitation may be further carried out based on the time-series waveform length corresponding values M and N or using the calculation domain width $T_p$ only.

Also, in the foregoing embodiment, the tire vibration detecting means has been described as an acceleration sensor 11. However, it may be any of other vibration detecting means, such as a pressure sensor. Also, the acceleration sensor 11 may be located in positions other than described, such as one each in positions a given axial distance away from the axial center of a tire. Also, the number of the acceleration sensors 11 is not limited to one, but a plurality of acceleration sensors 11 may be located in a plurality of positions around the circumference of a tire.

Also, in the foregoing example, the feature vectors $X_i$ are the power values $x_{ik}$ of the filtered waveforms. But the time-varying dispersions of the $x_{ik}$ of the filtered waveforms may also be used as the feature vectors $X_i$. The time-varying dispersions can be expressed as Log $[x_{ik}(t)^2+x_{ik}(t-1)^2]$.

Or the feature vectors $X_i$ may be Fourier coefficients, which are vibration levels of specific frequency ranges when a Fourier transform is performed on a time-series waveform of tire vibration, or cepstral coefficients.

The cepstral coefficients can be obtained either by performing a Fourier transform again on the waveform after a Fourier transform by assuming it as a spectral waveform or by further obtaining AR coefficients by assuming the AR spectrums as waveforms (LPC Cepstrum) and can characterize the shape of the spectrums without being affected by the absolute level. Hence, the determination accuracy is improved over cases where frequency spectrums derived by a Fourier transform are used.

Also, in the foregoing embodiment, the feature vectors $X_i$ employed are the power values of the filtrated waves of time-series waveform of tire vibration or their time-varying dispersions, or cepstral coefficients. However, the computed values calculated from the respective elements $a_{ik}$ of the feature vectors $X_i$ and the depths of tire wear may be employed as new feature vectors $X_{Mi}$. Then, even when tire wear is involved, it is possible to determine a road surface condition with excellent accuracy.

Figure 13A:
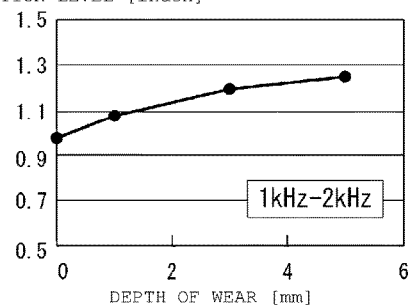
FIG. 13A, FIG. 13B, and FIG. 13C are diagrams showing relationship between feature vectors and depths of wear.
Figure 13B:
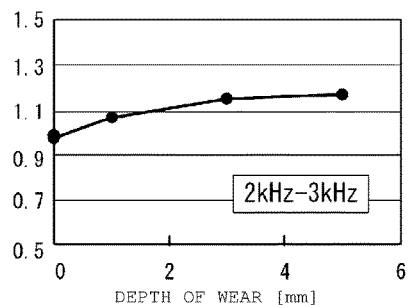
Figure 13C:
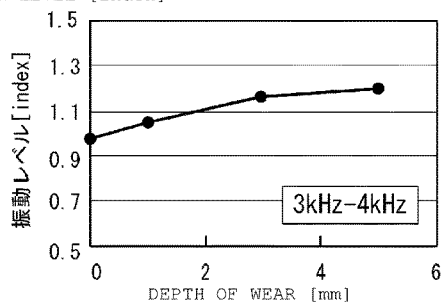

As shown in FIGS. 13A to 13C, the respective elements $a_{ik}$ of the feature vectors $X_i$ change with the progress of wear. In the figures, the horizontal axis is the depth of wear [mm], and the vertical axis the vibration level [index] in respective frequency ranges.

In the present example, the values $b_k$, representing the changes in vibration level, which are the elements $a_{ik}$ of the feature vectors $X_i$, approximated in polynomials, are used as the new feature vectors $X_{Mi}$. At the same time, the GA kernels $K_D$ (X, Y), $K_W$ (X, Y), $K_S$ (X, Y), $K_I$ (X, Y) are respectively calculated from the feature vectors $X_{Mi}$ and the support vectors $Y_{ASV}$, $Y_{nASV}$ (A=D, W, S, I) of the DRY model, WET model, SNOW model, and ICE model. Then a road surface condition is determined by use of models learned by SVM. Note that it goes without saying that the respective elements of the support vectors $Y_{ASV}$, $Y_{nASV}$ of the above-mentioned models are also the values of the changes in vibration level approximated in polynomials in the same way as the new feature vectors $X_{Mi}$.

Alternatively, the depth of tire wear may be added to the elements $a_{ik}$ of the feature vectors $X_i$. In such a case, too, tires representing a plurality of wear levels are prepared in advance, and tire vibration is measured in different road surface conditions. And the discriminant functions may be obtained by a machine learning technique such as SVM from the derived data of tire vibration. The machine learning technique to be employed may be the Fisher discrimination least-square approach or the like.

Also, the coefficient of the discriminant function may be used as the function of the depth of tire wear to perform the determination of a road surface condition in consideration of the depth of tire wear.

In any of the above cases, the determination of a road surface condition with tire wear taken into consideration can be carried out without preparing a map for each depth of wear. Hence, the speed of calculation can be improved, and it is possible to prevent the cost rise with increased memory.

Also, in the foregoing embodiment, the GA kernels are used as the kernel functions. But the dynamic time warping kernel functions (DTW kernels) may be used instead as shown in the following equation (11) or equation (12):

[Formula 4]

$$K'_1(X, Y) = \exp\left(-\arg\min_{\pi \in A(x,y)} \frac{1}{|\pi|} \sum_{s=1}^{|\pi|} \|x_{\pi 1(s)} - x_{\pi 2(s)}\|^2\right) \quad (11)$$

$$K'_2(X, Y) = \arg\max_{\pi \in A(x,y)} \frac{1}{|\pi|} \sum_{s=1}^{|\pi|} \exp\left(-\frac{\|X_{\pi 1(s)} - x_{\pi 2(s)}\|^2}{\sigma^2}\right) \quad (12)$$

where π is a path and A ($x_i$, $x_j$) are all the possible paths.

Figure 14:
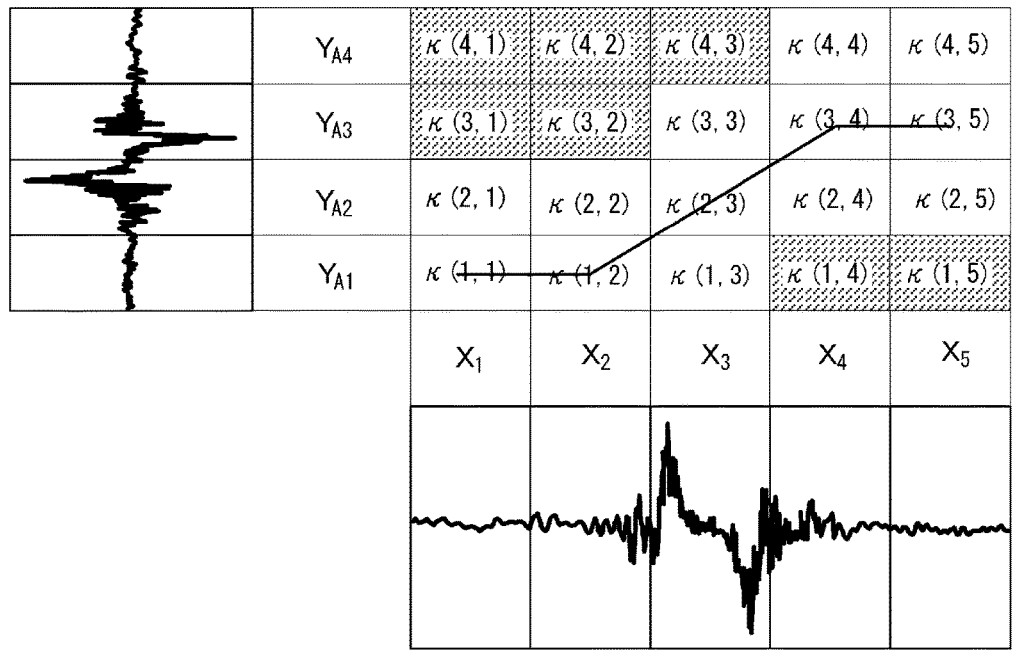
FIG. 14 is a diagram showing how to calculate DTW kernels.

As shown in FIG. 14, the DTW kernel K'(X, Y) consists of a total sum of the paths along which the total sum of K'$_{ij}$(X$_i$, Y$_j$) becomes the largest or the smallest of all the paths as shown by a thick solid line, for example, when the total sum of the local kernels K$_{ij}$(X$_i$, Y$_j$) is obtained.

At this time, a path limitation in the same manner as in the foregoing embodiment may be applied, and then the total sum of paths which takes the maximum or minimum total sum of κ'$_{ij}$(X$_i$, Y$_j$) out of all the paths may be obtained. Then the speed of calculation can be greatly improved, and also the reliability can be improved.

EXAMPLE 1

Test vehicles each fitted with a tire having an acceleration sensor installed thereon were operated to run at speeds ranging from 30 to 90 km/h on each of the DRY, WET, SNOW, and ICE road surfaces. Then kernel functions were calculated from the time-series waveforms of tire vibration thus obtained. And the road surface conditions were determined using the models learned by SVM models, and the speed of calculation was measured at two points, namely, 30 km/h and 90 km/h. Table 1 below shows the results of measurement at 30 km/h and 90 km/h.

TABLE 1

| Tire speed |
| --- |
| Calculation time/Revolution time |
| Accuracy of determinations |

Four SVM models were structured, which were for the determination of DRY and other road surface conditions, WET and other road surface conditions, SNOW and other road surface conditions, and ICE and other road surface conditions, respectively. And the road surface condition of the model which showed the highest SVM score when the test data other than those used in learning were inputted in the respective models was determined to be the condition of the road surface on which the vehicle was running.

The test vehicle was a front-drive vehicle, and the tire size was 165/70R14.

Note that the tread pattern of the tires used was BLIZZK REV02 (Bridgestone).

The data used in learning accounted for ⅔ of the total data obtained, and the remaining ⅓ was used as data for calculation of the accuracy.

The speed of calculation was the calculation time divided by the tire revolution time, and the calculation environment was OS: Windows (registered trademark) 7 Professional SP1, CPU: Intel (R) Core i7-3540M, RAM: 16 GB.

As is clear from Table 1, the percentages of correct determinations were 96% or above at each of the speeds.

Also, when the vehicle speed was slow, that is, when the number of windows was large, road surface conditions could be determined within a time of about two revolutions of the tire. This confirms that speedy determination of a road surface condition is achieved.

EXAMPLE 2

An acceleration sensor is attached to each of a plurality of tires with different depths of wear (new tire, tire with 1 mm wear, tire with 3 mm wear, tire with 5 mm wear), and a vehicle, having these tires fitted on, was operated to run at 30 to 90 km/h on each of the DRY, WET, SNOW, and ICE road surfaces. Table 2 below shows the results of calculation of kernel functions from the time-series waveforms of tire vibration thus obtained and determination of road surface conditions using the models learned by SVM models.

In Example 1, feature vectors X were structured from the power values of bandpass filtered waves and the depths of wear, and road surface conditions were determined using the models learned by SVM. In Example 2, feature vectors X employed were the power values of bandpass filtered waves changing with the progress of wear converted into those of a new tire by predetermined approximation formulas, and road surface conditions were determined using the models learned by SVM.

Shown also as reference are the results of the conventional method of determining road surface conditions using the feature vectors without wear taken into consideration.

TABLE 2

| Conventional method | Example 1 | Example 2 |
| --- | --- | --- |
| New tire | | |
| Depth of wear: 1 mm | | |
| Depth of wear: 3 mm | | |
| Depth of wear: 5 mm | | |

Four SVM models were structured, which were for the determination of DRY and other road surface conditions, WET and other road surface conditions, SNOW and other road surface conditions, and ICE and other road surface conditions, respectively. And the road surface condition of the model which showed the highest SVM score when the test data other than those used in learning were inputted in the respective models was determined to be the condition of the road surface on which the vehicle was running.

The test vehicle was a front-drive vehicle, and the tire size was 165/70R14.

Note that the tread pattern of the tires used was BLIZZK REV02 (Bridgestone).

The data used in learning accounted for ⅔ of the total data obtained, and the remaining ⅓ was used as data for calculation of the accuracy.

As is clear from Table 2, with the conventional method, the percentage of correct determinations dropped with the progress of wear, whereas with Examples 1 and 2, which took wear into consideration, the percentage of correct determinations was as high as about 90% and above. It has been confirmed by this result that the present invention, when applied, can provide highly accurate determination of road surface conditions even when tire wear is in an advanced stage.

One aspect of the present invention provides a method for determining a condition of a road surface under a tire in motion by detecting tire vibration by a vibration detecting means disposed within the tire. The method includes step (a) of detecting the vibration of the tire in motion, step (b) of extracting a time-series waveform of the detected tire vibration, step (c) of extracting time-series waveforms in respective time windows of a predetermined time width by windowing the time-series waveform of tire vibration, step (d) of calculating feature vectors from the time-series waveforms in the respective time windows, step (e) of calculating kernel functions from the feature vectors calculated in step (d) and road surface feature vectors, which are the feature vectors of the respective time windows calculated from the time-series waveforms of tire vibration having been determined in advance for distinctive road surface conditions, and step (f) of determining a road surface condition based on the values of discriminant functions using the kernel functions. In this method, the kernel functions are the global alignment kernel functions, the dynamic time warping kernel functions, or the computed values of the kernel functions. Also, in step (e), the kernel functions are calculated after each of path elements calculated from one of the calculated feature vectors for the respective time widths and one of the road surface feature vectors is weighted by weighting parameters c using a time-series waveform length corresponding value N in the time-series waveform of tire vibration extracted in step (b) and a previously determined time-series waveform length corresponding value M in the time-series waveform of tire vibration. And in step (f), a road surface condition is determined by comparing the values of discriminant functions determined for the distinctive road surface conditions.

It is to be noted that the time-series waveform length corresponding value in the time-series waveform of tire vibration (hereinafter referred to as "time-series waveform length corresponding value") is a physical quantity corresponding to the time length of one revolution of a tire, such as the time length of the time-series waveform of tire vibration for one revolution of a tire or the time interval between the leading-end peak and the trailing-end peak in the time-series waveform of tire vibration.

In this manner, in calculating the kernel functions K (X, Y), the path elements as noise which do not contribute to the determination of the degree of similarity are not used as the path elements in calculating the kernel functions. As a result, the accuracy in determining a road surface condition can be improved, and at the same time the speed of calculation can be increased. This makes it possible to determine a road surface condition in real time. Also, weighting is done by the weighting parameters ω using the time-series waveform length corresponding values N and M. Thus the weighting of path elements can be optimized even when there is a difference between the total number of calculated feature vectors for the respective time widths and the total number of road surface feature vectors. Accordingly, the accuracy in determining a road surface condition can be improved.

It is to be noted that the feature vectors $X_i$ to be employed may be any one, two, or all of the vibration levels of specific frequency ranges in the time-series waveform in each time window extracted by windowing, the time-varying dispersions of vibration levels of the specific frequency ranges, and the cepstral coefficients of the time-series waveform.

Also, the vibration levels of the specific frequency ranges are obtained from the frequency spectra of the time-series waveforms of the respective time windows extracted by windowing or the time-series waveforms obtained by passing the time-series waveforms of the respective time windows extracted by windowing through bandpass filters. However, the vibration levels of the specific frequency ranges may be obtained from the time-series waveforms of the respective time windows extracted by windowing the time-series waveforms obtained by passing the time-series waveform of tire vibration through bandpass filters.

Also, the time-series waveform length corresponding values M and N may be any one or a plurality of the length of the time-series waveform of tire vibration, the tire rotation speed at the acquisition of the time-series waveform of tire vibration, the length of the time-series waveform of tire vibration, and the inter-peak distance in the time-series waveform of tire vibration, which are the parameters corresponding to the total number of feature vectors for the respective time widths, or any one or a plurality of the computed values of the length of the time-series waveform of tire vibration, the tire rotation speed at the acquisition of the time-series waveform of tire vibration, the length of the time-series waveform of tire vibration, and the inter-peak distance in the time-series waveform of tire vibration. Then weighting when there is a difference between the total number of calculated feature vectors for the respective time widths and the total number of road surface feature vectors can be done easily and accurately.

Also, another aspect of the present invention provides a method in which, in step (e), the paths for calculating kernel functions are only the paths passing through one or both of the paths corresponding to the path elements $(X_f, Y_f)$ corresponding to the feature vectors $X_f$ including the leading-end peak and the road surface feature vectors $Y_f$ including the leading-end peak and the path elements $(X_k, Y_k)$ corresponding to the feature vectors $X_k$ including the trailing-end peak and the road surface feature vectors $Y_k$ including the trailing-end peak.

In this manner, the paths passing through the path elements corresponding to the peaks in the time-series waveform only may be used in calculating the kernel functions. Thus more accurate degrees of similarity can be obtained using a fewer number of paths. As a result, the time for calculation can be shortened markedly, and the accuracy in determining a road surface condition can be improved easily.

Also, the depth of tire wear may be added to the components of the feature vectors. Or the components of the feature vectors to be employed may be the computed values of the feature vectors calculated respectively from the time-series waveforms of the respective time windows and the depths of tire wear. Or the coefficient of the discriminant functions may be the function of the depth of tire wear. In this manner, a road surface condition may be determined using the depth of tire wear. Then the accuracy in determining a road surface condition may be further improved. At the same time, the determination of a road surface condition can be performed with greater efficiency because it is no longer necessary to determine the road surface condition for each depth of wear.

The foregoing description of the present invention does not recite all of the essential features of the invention, and it is to be understood that any subcombinations of the groups of features fall within the scope of this invention.

DESCRIPTION OF REFERENCE NUMERALS 10 road surface condition determining apparatus
11 acceleration sensor
12 vibration waveform extracting means
13 windowing means
14 feature vector calculating means
15 storage means
16 kernel function calculating means
161 weighting parameter calculating unit
162 kernel function calculating unit
17 road surface condition determining means
20 tire
21 inner liner
22 tire air chamber

The invention claimed is:
1. A method for determining a condition of a road surface under a tire in motion by detecting tire vibration by a vibration detecting means disposed within the tire, the method comprising:
   detecting the tire vibration of the tire in motion;
   extracting a time-series waveform of the detected tire vibration;

extracting time-series waveforms in respective time windows of a predetermined time width by windowing the time-series waveform of the detected tire vibration;

calculating feature vectors for the time-series waveforms in the respective time windows;

calculating a kernel function from the calculated feature vectors and road surface feature vectors, the road surface feature vectors being feature vectors of the respective time windows calculated from the time-series waveforms of the detected tire vibration having been determined in advance for distinctive road surface conditions; and determining a road surface condition based on values of discriminant functions using the kernel function;

wherein the kernel function is one of a global alignment kernel function, a dynamic time warping kernel function, or a computed values of the kernel function, wherein in the calculating the kernel function, the kernel function is calculated after each of path elements calculated from one of the calculated feature vectors for the respective time widths and one of the road surface feature vectors is weighted by a weighting parameter $\omega$ using a first time-series waveform length corresponding value in the time-series waveform of the detected tire vibration and a previously determined second time-series waveform length corresponding value in another time-series waveform of tire vibration, and wherein in the determining the road surface condition, the road surface condition is determined by comparing the values of discriminant functions determined for the distinctive road surface conditions.

2. The method for determining a road surface condition according to claim 1, wherein the first time-series waveform length corresponding value is any one or a plurality of the length of the time-series waveform of the detected tire vibration, the tire rotation speed at the acquisition of the time-series waveform of the detected tire vibration, and the inter-peak distance in the time-series waveform of the detected tire vibration, or the computed value of any one or a plurality of the length of the time-series waveform of the detected tire vibration, the tire rotation speed at the acquisition of the time-series waveform of the detected tire vibration, and the inter-peak distance in the time-series waveform of the detected tire vibration.

3. The method for determining a road surface condition according to claim 1, wherein in the calculating the kernel functions, the paths for calculating kernel functions are only the paths passing through one or both of the path elements corresponding to the feature vectors including the leading-end peak and the road surface feature vectors including the leading-end peak and the path elements corresponding to the feature vectors including the trailing-end peak and the road surface feature vectors including the trailing-end peak.

4. The method for determining a road surface condition according to claim 1, wherein the depth of tire wear is added to the components of the feature vectors.

5. The method for determining a road surface condition according to claim 1, wherein the components of the feature vectors to be employed are the computed values of the feature vectors calculated respectively from the time-series waveforms of the respective time windows and the depths of tire wear.

6. The method for determining a road surface condition according to claim 1, wherein the coefficient of the discriminant functions is the function of the depth of tire wear.

* * * * *